United States Patent [19]

Delgado et al.

[11] Patent Number: 5,719,247

[45] Date of Patent: *Feb. 17, 1998

[54] TACK-FREE ELASTOMERIC ACRYLATE MICROSPHERES

[75] Inventors: Joaquin Delgado, Stillwater; Spencer F. Silver, White Bear Lake, both of Minn.

[73] Assignee: Minnesota Mining and Manufacturing Company, St. Paul, Minn.

[*] Notice: The term of this patent shall not extend beyond the expiration date of Pat. No. 5,266,402.

[21] Appl. No.: 675,515

[22] Filed: Jul. 3, 1996

Related U.S. Application Data

[63] Continuation of Ser. No. 448,895, May 24, 1995, abandoned, which is a continuation of Ser. No. 101,288, Aug. 3, 1993, abandoned, which is a continuation-in-part of Ser. No. 809,422, Dec. 17, 1991, abandoned.

[51] Int. Cl.$^6$ .................................................. C08F 236/00
[52] U.S. Cl. .................. 526/323.2; 526/263; 526/264; 526/298; 526/307.7; 526/318.4; 526/320; 526/328; 526/328.5; 428/36.8; 428/402
[58] Field of Search .................. 428/32.8, 402; 526/318.43, 263, 264, 298, 307.7, 318.4, 320, 323.2, 328, 328.5

[56] References Cited

U.S. PATENT DOCUMENTS

| | | | |
|---|---|---|---|
| 3,615,972 | 10/1971 | Morehouse, Jr. et al. | 156/79 |
| 3,620,988 | 11/1971 | Cohen | 260/17.4 |
| 3,691,140 | 9/1972 | Silver | 260/78.5 |
| 3,720,534 | 3/1973 | Macauley et al. | 117/36.2 |
| 3,912,581 | 10/1975 | Fink et al. | 162/164 |
| 4,166,152 | 8/1979 | Baker et al. | 428/522 |
| 4,370,160 | 1/1983 | Ziemelis | 71/117 |
| 4,598,112 | 7/1986 | Howard | 524/78 |
| 4,645,783 | 2/1987 | Kinoshita | 523/221 |
| 4,735,837 | 4/1988 | Miyasaka et al. | 428/40 |
| 4,786,696 | 11/1988 | Bohnel | 526/88 |
| 4,810,763 | 3/1989 | Mallya et al. | 526/203 |
| 4,824,616 | 4/1989 | Shimizu et al. | 264/7 |
| 4,839,416 | 6/1989 | Orenstein et al. | 524/558 |
| 4,855,170 | 8/1989 | Darvell et al. | 428/40 |
| 4,925,908 | 5/1990 | Bernard et al. | 526/320 |
| 4,931,347 | 6/1990 | Slovinsky et al. | 428/192 |
| 4,931,357 | 6/1990 | Marshall et al. | 428/284 |
| 4,937,173 | 6/1990 | Kanda et al. | 430/281 |
| 4,988,567 | 1/1991 | Delgado | 428/402 |
| 5,045,569 | 9/1991 | Delgado | 521/60 |
| 5,053,436 | 10/1991 | Delgado | 521/64 |
| 5,266,402 | 11/1993 | Delgado | 428/355 |

FOREIGN PATENT DOCUMENTS

| | | |
|---|---|---|
| 0 034 087 | 8/1981 | European Pat. Off. . |
| 0 371 635 | 6/1990 | European Pat. Off. . |
| 0 420 988 | 4/1991 | European Pat. Off. . |
| 3544882 | 11/1986 | Germany . |
| 63-260973 | 10/1988 | Japan . |
| WO 92/11334 | 7/1992 | WIPO . |

OTHER PUBLICATIONS

Hung-Ya Chao, United States Statutory Invention Registration No. H509 entitled *Preparation of Adhesives*, Aug. 2, 1988.
PTO 93-1353, English Translation of Japan Kokai 63-260973, Mar. 1993.
H409, Stanley, Jan. 1988.
Radcure '86 Conference Proceedings, Baltimore, Maryland (1986).
S.L. Rosen, Fundamental Principles of Polymeric Materials, Wiley, New York, p. 259, 1982.
D.S. Satas, *Handbook of Pressure Sensitive Adhesive Technology*, 2nd Ed., Von Nostrand Reinhold, New York, pp. 39–45 and pp. 171–173, 1989.

Primary Examiner—Romulo H. Delmendo
Attorney, Agent, or Firm—Janice L. Dowdall

[57] ABSTRACT

The invention relates to a swellable, solvent-insoluble, tack-free, elastomeric, acrylate microsphere having a shear storage modulus of at least $6.0 \times 10^6$ Pascals at 23° C. and 1 Hz and a Tg of less than about 0° C., wherein the microsphere comprises the polymerization product of:

(a) about 40 to 99.7 equivalent weight % of free radically polymerizable monomer selected from the group consisting of alkyl acrylate esters of non-tertiary alkyl alcohols, the alkyl groups of the alcohols which comprise from about 4 to about 18 carbon atoms, alkyl methacrylate esters of non-tertiary alkyl alcohols, the alkyl groups of the alcohols which comprise from about 4 to about 18 carbon atoms, and mixtures thereof;

(b) optionally, about 45 to about 1 equivalent weight % polar monomer copolymerizable with the monomer of element (a); and (c) about 10 to about 0.3 equivalent weight % of a multifunctional crosslinking agent.

The invention also relates to processes of preparing suspensions of the microspheres and the suspensions produced thereby.

15 Claims, No Drawings

TACK-FREE ELASTOMERIC ACRYLATE MICROSPHERES

This is a continuation of application Ser. No. 08/448,895 filed May 24, 1995, now abandoned, which is a continuation of application Ser. No. 08/101,288 filed Aug. 3, 1993 (now abandoned) which was a continuation-in-part of application Ser. No. 07/809,422 filed Dec. 17, 1991 (now abandoned).

FIELD OF THE INVENTION

This invention relates to swellable, infusible, solvent-insoluble, tack-free, elastomeric acrylate microspheres, a method for producing such microspheres, and suspensions containing such microspheres.

BACKGROUND OF THE INVENTION

Tacky, elastomeric, acrylate microspheres are well known and numerous references concern the preparation and/or use of these inherently tacky, elastomeric acrylate polymeric microspheres. Such solid spheres and their preparation are disclosed in U.S. Pat. No. 3,691,140 (Silver), assigned to the assignee of the present case. These microspheres are prepared by aqueous suspension polymerization of alkyl acrylate monomers and ionic comohomers, e.g., sodium methacrylate, in the presence of an emulsifier, preferably an anionic emulsifier. The use of a water-soluble, substantially oil-insoluble ionic comonomer is critical to preventing coagulation or agglomeration of the microspheres. U.S. Pat. No. 4,166,152 (Baker et al.) also describes solid, inherently tacky (meth)acrylate microspheres which are prepared by an alternative method; in this case from alkyl acrylate or methacrylate monomer(s) in the presence of both an emulsifier and an ionic suspension stabilizer having an interfacial tension sufficient to prevent microsphere agglomeration. Baker et al. discloses that through the addition of an oil soluble and non-ionic copolymerizable monomer, such as divinylbenzene, to the microsphere composition, the tack of the acrylate microspheres can be varied.

Hollow inherently tacky, elastomeric acrylate microspheres and methods for their preparation are disclosed in U.S. Pat. No. 5,045,569 (Delgado), assigned to the assignee of the present case. These hollow microspheres, which have a diameter of at least 1 micrometer and at least one internal void, are prepared from alkyl acrylate or methacrylate monomer(s) and, optionally, at least one polar comonomer in the presence of an emulsifier having the hydrophilic-lipophilic balance value sufficient to allow the formation of cavity-containing droplets. Delgado also discloses that the composition of these tacky, hollow microspheres can also contain a multifunctional (meth)acrylate crosslinking agent, such as 1,4-butanediol diacrylate or 1,6-hexanediol diacrylate, or other multifunctional crosslinking agents, such as divinylbenzene.

DE 3,544,882 A1 (Nichiban) describes crosslinked microspheres composed of 90 to 99.5 weight percent of (meth) acrylate ester and 10 to 0.5 weight percent of vinyl type monomer, e.g., acrylic acid, having a reactive functional group through which crosslinking is achieved by reaction with an oil-soluble crosslinking agent. The microspheres are prepared by dispersing in water a solution (in organic solvent) of copolymer prepared by known methods such as solution, bulk, emulsion, or suspension polymerization. (However, the Nichiban reference notes that in cases where emulsion or suspension polymerization is used with water as a dispersion medium, it is not necessary to make a new aqueous dispersion.) When tacky, the spheres are said to be useful in spray or coated sheet form as "removable adhesive". The stated purpose of the invention is to provide microspheres having a uniform particle size, but it is also stated that the microspheres may contain other monomers such as vinyl acetate, styrene, acrylonitrile, methacrylonitrile, etc., ". . . to prevent partial transfer of the adhesive when the carrier (backing) is pulled away from the substrate . . .". U.S. Pat. No. 4,735,837 (Miyasaka et al.) discloses a detachable adhesive sheet having an adhesive layer containing the "elastic micro-balls" disclosed above, wherein the microballs partially protrude from the surface of the adhesive layer.

Silicone spherical particles are described in U.S. Pat. No. 4,824,616 (Shimizu et al.) in which silicone gel particles are cured in situ in a liquid, forming uniform particles with diameters of 0.01 mm to 20 mm having a tack-free, elastomeric outer layer. Shimizu et al. teaches that these crosslinked spherical silicone particles can be used as vibration-resisting or shock absorbing modifying additives in organic resins. U.S. Pat. No. 4,370,160 (Ziemelis) describes a process for preparing radiation crosslinked solid silicone microparticles which can be used as filler particles in greases, sealants, adhesives, and other fluid compositions.

U.S. Pat. No. 3,615,972 (Morehouse) describes the use of organic materials, such as homopolymers or copolymers of alkenyl aromatic monomers, vinyl esters, acrylic esters, and/or vinyl chloride or vinylidene chloride and the like, to encapsulate liquid blowing agents using a limited coalescence technique with the intent of producing expandable thermoplastic resinous beads. Morehouse teaches the use of up to about 0.6 weight % of difunctional monomers, such as divinyl benzene and ethylene glycol dimethacrylate, to decrease the melt or flow viscosity of the thermoplastic polymer microcapsules.

U.S. Pat. No. 3,620,988 (Cohen) describes the polymerization of 2-ethylhexyl acrylate using a small amount, 0.10%, of an "unknown crosslinking monomer". This polymer yields a material which has pressure-sensitive adhesive characteristics that exceed such characteristics found in ordinary planar adhesive coatings. Cohen also describes the use of small proportions of polyunsaturated monomers during the polymerization of acrylate and methacrylate monomers listed in his application.

U.S. Pat. No. 3,912,581 (Fink et al.) also describes the use of crosslinking agents in the polymerization of suspensions to make particles, but specifies that "the particles must be capable of thermoplastic welding or fusion . . . upon heating". Therefore, the particles must form a self-supporting continuous sheet.

JP 63 260,973 (Sekisui) discloses a method of manufacture of pressure-sensitive adhesive microspheres ranging in particle size from 10–150 micrometers. These tacky microspheres are prepared through the suspension polymerization of an acrylate or methacrylate monomer, a copolymerizable water soluble monomer, and from 0.01 to 0.5 parts by weight of an oil soluble multi-functional crosslinking agent having at least two polymerizable double bonds. If more than the claimed proportion of multi-functional crosslinker is added to this composition, Sekisui teaches that the high degree of crosslinking adversely effects the adhesion of the microspheres. A related application, JP 63 260,973 (Sekisui), discloses acrylate microspheres ranging from 10 to 150 micrometers in particle size formed through the suspension polymerization of an oil soluble (meth)acrylate with up to 0.5 mole % of a water-soluble multi-functional monomer.

Kanda, in Radcure '86 Conference Proceedings, Sep. 8–11, 1986, describes microgel particles in the range 0.02 to 0.2 nm in diameter. The microgels were used as both viscosity modifiers and opacifiers. U.S. Pat. No. 4,937,173 (Kanda et al.) describes a radiation curable liquid resin composition filed with crosslinked (meth)acrylate particles ranging from 0.01 to 0.6 microns in diameter. Kanda et al. further describes the shear thinning effect of these particles when they are incorporated into the radiation curable resin of the invention.

EP 420,988 A1 (Banba et al.) discloses tough and resilient microspheres crosslinked with oligomeric or polymeric multifunctional urethane acrylates. These microspheres are formed by radical polymerization of a vinyl-functional component and a vinyl group-containing compound capable of radical polymerization which is obtained by the reaction of: one or more than one kind of polyol (a) containing polyester polyol and/or polyether polyol; one or more than one kind of compound (b) containing two or more isocyanate groups in the molecule; and, one or more than one kind of active hydrogen-containing vinyl monomer (c) capable of radical polymerization.

All of the above mentioned references disclose either: tacky acrylate microspheres; non-acrylate, silicone, elastomeric microspheres; or tack-free, resinous, non-elastomeric beads. A need thus exists for acrylate microspheres which are elastomeric and tack-free and are useful as fillers for such products as sealers, coatings, adhesives, and the like.

SUMMARY OF THE INVENTION

This invention provides swellable, infusible, solvent-insoluble, tack-free, elastomeric acrylate microspheres. They may be either hollow or solid microspheres.

Specifically, the swellable, infusible, solvent-insoluble, tack-free, elastomeric, acrylate microspheres having a shear storage modulus of at least $1.0 \times 10^6$ Pascals at 23° C. and 1 Hz and a Tg less than about 0° C. of the invention comprise:

(a) about 40 to about 99.7 equivalent weight % of free radically polymerizable monomer selected from the group consisting of monofunctional ethylenically unsaturated alkyl acrylate esters of non-tertiary alkyl alcohols, wherein the alkyl groups of the alcohols comprise from about 4 to about 14 carbon atoms; monofunctional ethylencially unsaturated alkyl methacrylate esters of non-tertiary alkyl alcohols, wherein the alkyl groups of the alcohols comprise from about 4 to about 14 carbon atoms; and mixtures thereof;

(b) optionally, about 45 to about 1 equivalent weight % of polar monomer copolymerizable with the monomer of element (a); and (c) about 10 to about 0.3 equivalent weight % of a multifunctional crosslinking agent.

The alkyl acrylate ester of non-tertiary alkyl alcohols can actually be formed from alcohols having alkyl groups comprising from about 4 to about 18 carbon atoms. Likewise the alkyl methacrylate esters of non-tertiary alkyl alcohols can actually be formed from non-tertiary alkyl alcohols having alkyl groups comprising from about 4 to about 18 carbon atoms.

These terms have the following meanings as used herein:

1. The term "elastomeric" has been described, for example, as, ". . . applying to amorphous or non-crystalline materials that can be stretched to at least twice their original length and which will retract rapidly and forcibly to substantially their original dimensions upon release of the force." [S. L. Rosen, *Fundamental Principles of Polymeric Materials*, Wiley: New York, p. 314 (1982), incorporated by reference herein]

2. The term "tack-free" indicates that the materials display no perceived tack when subjected to a "thumb test" as described by D. S. Satas in the *Handbook of Pressure Sensitive Adhesive Technology*, 2nd ed., Von Nostrand Reinhold: New York, p. 39 (1989), incorporated by reference herein.

3. The term "solvent insoluble" in reference to a polymeric material refers to a polymeric material which is not dispersed on a molecular level in common organic solvents.

4. The term "solvent swellable" in reference to a polymeric material refers to a polymeric material that swells in solvent to an extent larger than its original dimension and forms a dispersion consisting, substantially, of individual particles.

5. The terms "equivalent wt %" or "equivalent weight %" of a given compound mean the number of equivalents of that compound divided by the total number of equivalents in the composition, wherein an equivalent is the number of grams divided by the equivalent weight. The equivalent weight means the molecular weight divided by the number of polymerizable groups in the monomer (in the case of those monomers with only one polymerizable group, equivalent weight=molecular weight).

6. The term "droplet" means the liquid stage of the microspheres prior to the completion of polymerization.

7. The term "cavity" means a space within the walls of a droplet or microsphere when still in the suspension or dispersion medium prior to drying, and thus containing whatever medium was used.

8. The term "void" means an empty space completely within the walls of a polymerized microsphere.

9. The term "hollow" means containing at least one void or cavity.

10. The term "shear storage modulus" represents, ". . . the stored elastic strain energy when a polymer sample is stressed at a given strain rate." [Taken from S. L. Rosen, *Fundamental Principles of Polymeric Materials*, Wiley: New York, p. 259 (1982), incorporated by reference herein]

All percents, parts, and ratios described herein are by weight unless specifically stated otherwise.

DETAILED DESCRIPTION OF THE INVENTION

Alkyl acrylate esters and methacrylate esters useful in preparing the microspheres of this invention are selected from the group consisting of monofunctional ethylenically unsaturated alkyl acrylate esters and alkyl methacrylate esters of non-tertiary alkyl alcohols, the alkyl groups of which have from about 4 to about 14 carbon atoms. Such monomers are oleophilic, water emulsifiable, have restricted water solubility, and as homopolymers, generally have glass transition temperatures below about −20° C. Included within this class of monomers are, for example, those monomers selected from the group consisting of isooctyl acrylate, 4-methyl-2-pentyl acrylate, 2-methylbutyl acrylate, isoamyl acrylate, sec-butyl acrylate, n-butyl acrylate, 2-ethylhexyl acrylate, isodecyl methacrylate, isononyl acrylate, isodecyl acrylate, mixtures thereof, and the like. Preferred acrylate monomers include those selected from the group consisting of isooctyl acrylate, isononyl acrylate, isoamyl acrylate, isodecyl acrylate, 2-ethylhexyl acrylate, n-butyl acrylate, sec-butyl acrylate, mixtures thereof, and the like.

Alkyl acrylate esters, alkyl methacrylate esters, or other free radically polymerizable monofunctional ethylenically unsaturated vinyl monomers which, as homopolymers, have glass transition temperatures higher than about −20° C., e.g., tert-butyl acrylate, isobornyl acrylate, butyl methacrylate, vinyl acetate, and the like, may be utilized in conjunction with one or more of the alkyl acrylate esters or alkyl methacrylate esters provided that the glass transition temperature of the resultant polymer is below about −20° C. Tack-free microspheres of the invention may be prepared using acrylate or methacrylate monomer(s) alone or in combination with other vinyl monomers, e.g., vinyl acetate, provided that the glass transition temperature of the resultant polymer is below about −20° C.

The microspheres of the invention may optionally further comprise polar copolymerizable monomer(s). The polar monomer(s) selected must be copolymerizable with the alkyl acrylate esters and/or alkyl methacrylate esters. Examples of useful polar copolymerizable monomers include those selected from the group consisting of strongly polar copolymerizable monomers such as ethylenically unsaturated monocarboxylic and dicarboxylic acids, hydroxyalkyl acrylates, cyanoalkyl acrylates, acrylamides, substituted acrylamides, and mixtures thereof, and those selected from the group consisting of moderately polar copolymerizable monomers such as N-vinyl pyrrolidone, acrylonitrile, and mixtures thereof. Preferred polar monomers include those selected from the group consisting of acrylic acid, ammonium acrylate, acrylonitrile, n-vinyl pyrrolidone, and mixtures thereof.

The composition used to prepare the microsphere also contains a multifunctional crosslinking agent. The term "multifunctional" as used herein refers to crosslinking agents which possess two or more free radically polymerizable ethylenically unsaturated groups. Useful multifunctional crosslinking agents include those selected from the group consisting of acrylic or methacrylic esters of diols such as butanediol, triols such as glycerol, and tetraols such as pentaerythritol. Other useful crosslinking agents include those selected from the group consisting of other multifunctional vinyl compounds and multifunctional acrylated oligomers. Preferred crosslinking agents include those selected from the group consisting of multifunctional (meth) acrylates, e.g., 1,4-butanediol diacrylate or 1,6-hexanediol diacrylate; polyvinylic crosslinking agents, such as substituted and unsubstituted divinylbenzene; and difunctional urethane acrylates, such as Ebecryl™ 270 and Ebecryl™ 230 (1500 weight average molecular weight and 5000 weight average molecular weight acrylated polyurethanes, respectively—both available from Radcure Specialties).

The relative amounts of the above components are important to the properties of the resultant microsphere. As indicated above, the microspheres comprise about 40 to about 99.7 equivalent weight % alkyl acrylate ester(s), alkyl methacrylate ester(s), or mixtures thereof; optionally about 45 to about 1 equivalent weight % polar monomer; and about 10 to 0.3 equivalent weight % multifunctional crosslinking agent. Preferably, the microspheres of the invention comprise about 80 to about 99.7 equivalent weight % of alkyl acrylate or alkyl methacrylate ester or mixtures thereof, about 0 to about 20 equivalent weight % polar copolymerizable monomer, and about 0.3 to about 7.0 equivalent weight % of multifunctional crosslinking agent.

If too much alkyl acrylate ester or alkyl methacrylate ester is used or if too little multifunctional crosslinking agent is used, the shear storage modulus of the microspheres falls below $1.0 \times 10^6$ Pascals at 23° C. and 1 Hz and the microspheres become tacky. If insufficient alkyl acrylate ester or alkyl methacrylate ester is used or if too much multifunctional crosslinking agent is used, the Tg rises and the microspheres of the present invention become glassy.

The microspheres of the invention possess a shear storage modulus of at least $1.0 \times 10^6$ Pascals at 23° C. and 1 Hz. This threshold [as described by D. Satas in *The Handbook of Pressure Sensitive Adhesive Technology*, 2nd ed., Von Nostrand Reinhold: New York, p. 172–173 (1989), incorporated by reference herein, exceeds the Dahlquist Criterion which states that, to exhibit pressure sensitive adhesive properties at room temperature (i.e., to be "tacky"), such adhesive must have a 1-second creep compliance greater than $1 \times 10^6$ dyne/cm$^2$. This creep compliance value translates into a maximum shear storage modulus of $5 \times 10^6$ dynes/cm$^2$, or $5 \times 10^5$ Pascals, at 23° C. and 1 Hz.

The microspheres of the invention have a glass transition temperature (Tg) of less than about 0° C., preferably about −100° C. to about −20° C. If the glass transition temperature of the microspheres rises above 0° C., then the microspheres will become glassy and have reduced elasticity.

The microspheres of the invention are tack-free. They are elastomeric, insoluble but swellable in organic solvents, and small, typically having diameters of at least 1 micrometer, preferably in the range of about 1 to about 250 micrometers. The microspheres prepared by the methods of this invention may be solid or may have one or more internal voids. When hollow, the voids of the microspheres typically range in size of up to about 100 micrometers or larger.

The microspheres of the invention are tack-free, and do not form coherent films.

Copending U.S. application Ser. No. 07/629,519, Delgado et al., incorporated by reference herein, filed Dec. 18, 1990 (assigned to the assignee of the present case), now U.S. Pat. No. 5,266,402, describes the use of the swellable, elastomeric microspheres dispersed in an alkyl acrylate pressure sensitive adhesive matrix, the microspheres and matrix forming an interpenetrating polymer network within the boundaries of the microspheres. Pressure-sensitive adhesives containing the microspheres provide enhanced optical clarity, improved low temperature damping properties, and increased tack over the unfilled pressure sensitive adhesive matrix.

Processes for making tacky microspheres are disclosed in U.S. Pat. Nos. 3,691,140 (Silver); 4,166,152 (Baker et al.); 4,988,567 (Delgado); and 5,053,436 (Delgado); all of which are incorporated herein by reference.

Manufacturing processes for the tack-free hollow microspheres of the invention include the preparation of aqueous suspensions by a "two-step" emulsification process which first involves forming a water-in-oil emulsion of a water phase consisting of water and, optionally, at least one polar monomer within oil phase comprising at least one alkyl acrylate ester or alkyl methacrylate ester, at least one multifunctional crosslinking agent, and at least one oil-soluble free radical initiator using an emulsifier having a low hydrophilic-lipophilic balance (HLB) value. Suitable emulsifiers are those having an HLB value below about 7, preferably in the range of about 2 to about 7. Examples of such emulsifiers include sorbitan monoleate, sorbitan trioleate, and ethoxylated oleyl alcohol such as Brij™ 93, available from Atlas Chemical Industries, Inc. Thus, in this first step, oil phase monomer(s), emulsifier, an oil-soluble free radical initiator, and a multifunctional crosslinking agent as defined above are combined to form an oil phase mixture. An aqueous solution of all or a portion of the polar monomer(s), if used, is then agitated and poured into the oil phase mixture to form a water-in-oil emulsion. A thickening agent, e.g., methyl cellulose may also be included in the aqueous phase of the water-in-oil emulsion. In the second step, a water-in-oil-in-water emulsion is formed by dispersing the water-in-oil emulsion of the first step into an aqueous phase containing an emulsifier having an HLB value above about 6. If polar monomer(s) is used, then the aqueous phase may also contain any portion of the polar monomer(s) which was not added in step one. Examples of emulsifiers having an HLB value above about 6 include ethoxylated sorbitan monooleate, ethoxylated lauryl alcohol, and alkyl sulfates. In both steps, emulsifier is utilized at a concentration greater than its critical micelle concentration, which is herein defined as the minimum concentration of emulsifier necessary for the formation of micelles, i.e., submicroscopic aggregations of emulsifier molecules. Critical micelle concentration is slightly different for each emulsifier, usable concentrations typically ranging from about $1.0 \times 10^{-4}$ to about 3 moles/liter. Additional detail concerning the preparation of water-in-oil-in-water emulsions, i.e., multiple emulsions, may be found in various literature references, e.g., Surfactant Systems: Their Chemistry, Pharmacy, & Biology, (D. Attwood and A. T. Florence, Chapman & Hall Limited, New York, N.Y. 1983), incorporated by reference herein. The final process step of this method of the invention involves the application of heat or radiation to initiate polymerization of the monomers. Useful initiators are those which are normally suitable for free radical polymerization of acrylate monomers and which are oil-soluble and of very low solubility in water. Examples of such initiators include those selected from the group consisting of thermally-activated initiators such as azo compounds, hydroperoxides, peroxides, and the like, and photoinitiators such as benzophenone, benzoin ethyl ether, and 2,2-dimethoxy-2-phenyl acetophenone. Use of a water-soluble polymerization initiator causes formation of substantial amounts of latex. The extremely small particle size of latex particles renders any significant formation of latex undesirable. The initiator is generally used in an amount ranging from about 0.01 percent up to about 10 percent by weight of the total polymerizable composition (i.e. the following if used: monomer such as alkyl acrylate ester, alkyl methacrylate ester, vinyl monomer, and/or polar monomer and crosslinking agent), preferably about 0.01 percent to about 5 percent.

Aqueous suspensions of hollow microspheres may also be prepared by a "one-step" emulsification process comprising aqueous suspension polymerization of at least one alkyl acrylate ester or alkyl methacrylate ester, multifunctional crosslinking agent(s), and at least one polar monomer in the presence of at least one emulsifier capable of producing a water-in-oil emulsion inside the droplets which is substantially stable during emulsification and polymerization. As in the two-step emulsification process, the emulsifier is utilized in concentrations greater than its critical micelle concentration. In general, high HLB emulsifiers are required, i.e., emulsifiers having an HLB value of at least about 25, will produce stable cavity-containing droplets during the polymerization, and are suitable for use in this one-step process. Examples of such emulsifiers include alkylarylether sulfates such as sodium alkylarylether sulfate, e.g., Triton™ W/30, available from Rohm and Haas, alkylarylpolyether sulfates such as alkylarylpoly(ethylene oxide) sulfates, preferably those having up to about 4 ethyleneoxy repeat units; alkyl sulfates such as sodium lauryl sulfate, ammonium lauryl sulfate, triethanolamine lauryl sulfate, and sodium hexadecyl sulfate; alkyl ether sulfates such as ammonium lauryl ether sulfate; and alkylpolyether sulfates such as alkyl poly(ethylene oxide) sulfates, preferably those having up to about 4 ethyleneoxy units. Alkyl sulfates, alkyl ether sulfates, and alkylarylether sulfates are preferred as they provide multiple voids having maximum void diameters per microsphere for a minimum amount of surfactant. Polymeric stabilizers may also be present.

Aqueous suspensions of solid microspheres may also be prepared by the "one-step" emulsification process described in U.S. Pat. No. 3,691,140 (Silver), comprising aqueous suspension polymerization of at least one alkyl acrylate or alkyl methacrylate ester monomer, a multifunctional crosslinking monomer or monomers, at least one emulsifier in a concentration greater than its critical micelle concentration, and optionally, at least one polar monomer. Examples of such emulsifiers, which are preferably anionic, include: alkylarylether sulfates such as sodium alkylarylether sulfate, e.g., Triton™ W/30, available from Rohm and Haas; alkylarylpolyether sulfates such as alkylarylpoly(ethylene oxide) sulfates; alkyl sulfates such as sodium lauryl sulfate, ammonium lauryl sulfate, triethanolamine lauryl sulfate, and sodium hexadecyl sulfate; alkyl ether sulfates such as ammonium lauryl ether sulfate; and alkylpolyether sulfates such as alkyl poly(ethylene oxide) sulfates. Alkyl sulfates, alkyl ether sulfates, and alkylarylether sulfates are preferred as they provide solid, tack-free acrylate microspheres which are easily dispersed. Alkylarylpolyether sulfonates such as alkylarylpoly(ethylene oxide) sodium sulfonate (e.g., Triton™ X-200, commercially available from the Rohm and Haas Co.), alkyl benzene sulfonates such as p-dodecyl benzene sodium sulfonate (e.g., Siponate DS-10™, commercially available from Alcolac, Inc.) and other sulfonate emulsifiers are also preferred. Non-ionic emulsifiers, e.g. Siponic™ Y-500-70 (ethoxylated oleyl alcohol available from Alcolac, Inc.), can also be utilized alone or in conjunction with anionic emulsifiers. Polymeric stabilizers, such as those described in U.S. Pat. No. 4,166,152 (Baker et al.), incorporated by reference herein, may also be present.

Following polymerization by any of the useful processes, an aqueous suspension of the tack-free microspheres is obtained which is stable to agglomeration or coagulation under room temperature conditions. The suspension may have non-volatile solids contents of from about 10 to about 50 percent by weight. Upon prolonged standing, the suspension separates into two phases, one phase being aqueous and substantially free of polymer, the other phase being an aqueous suspension of microspheres. Both phases may contain a minor portion of small latex particles. Decantation of the microsphere-rich phase provides an aqueous suspension having a non-volatile solids content on the order of about 40 to about 70 percent which, if shaken with water, will readily redisperse. If desired, the aqueous suspension of microspheres may be utilized immediately following polymerization to provide tack free microspheres.

The microspheres, with sufficient agitation, will readily disperse in common organic liquids such as ethyl acetate, tetrahydrofuran, heptane, 2-butanone, benzene, and cyclohexane.

The microspheres of the invention are useful as low Tg, low modulus fillers for sealers, coatings, and adhesives. They can also be useful as dry lubricants, vibration damping materials, and rheology control agents.

These and other aspects of the inventions are illustrated by the following examples which should not be viewed as limiting in scope.

| ABBREVIATIONS & TRADENAMES | |
|---|---|
| Ebecryl ™ 270 | acrylated polyurethane having a weight average molecular weight of 1500, available from Radcure Specialties |
| Ebecryl ™ 230 | acrylated polyurethane having a weight average molecular weight of 5000, available from Radcure Specialties |
| Lucidol ™ 70 | benzoyl peroxide available from Atochem North America, Inc. |
| Standapol ™ A | ammonium lauryl sulfate available from Henkel, GA. |
| Accostrength ™ 86 | acrylamide - sodium acrylate copolymer available from American Cyanamid Co. |
| IOA | isooctyl acrylate |
| AA | acrylic acid |
| BDA | 1,4-butanediol diacrylate |

Examples 1–9 illustrate the preparation of solid, crosslinked microspheres having moderate crosslink densities. All microspheres prepared according to these examples were found to be tack-free.

EXAMPLE 1

A 2-liter resin flask was charged with 900 ml of water and 6.0 grams of acrylic acid. The mixture was stirred and neutralized to a pH of 7.0 with concentrated ammonium hydroxide. 292.5 grams of IOA, 1.5 grams of BDA (0.93 equivalent wt %) and 1.42 grams of Lucidol™ 70 initiator were added and the flask sealed and purged with argon three times. Standapol™ A anionic surfactant, 12 g., was then added to the flask and the contents purged with argon once more. The mixture was agitated at 350 rpm while heating to 60° C. for approximately 20 hours. Upon cooling, a suspension of tack-free, elastomeric microspheres, with an average diameter of 49.6 microns, was obtained.

Particles prepared in this way are completely insoluble in all organic solvents. The particles swell in solvent, e.g. 70/30 heptane/isopropanol mixtures, to give a volume swell factor of about 5.5 (increase in diameter of 1.77 times).

EXAMPLES 2–4

The procedure of Example 1 was followed except that the amount of BDA was changed. Increasing the BDA content decreases the volume swell factor substantially, viz. for BDA contents of 1.0, 2.0, and 4.0 weight % (1.9, 3.8 and 7.1 equivalent wt. %), volume swell factors of 3.1, 2.2, and 1.1, respectively, were observed.

EXAMPLE 5

The procedure of Example 1 was followed. Ebecryl™ 270, 40.3 grams (3.3 equivalent weight %), was used in the above recipe in place of BDA. Microspheres having average diameters of 30 microns were obtained. Ebecryl™ 230, 40.3 grams (0.93 equivalent weight %), can be substituted with similar results. Microspheres having average diameters of 30 microns were obtained.

EXAMPLE 6

The procedure of Example 1 was followed except that 150 grams of lauryl acrylate was copolymerized with 0.75 gram of BDA (0.8 equivalent wt. %) and 3.6 grams of ammonium acrylate to yield microspherical particles of about 36.5 microns in diameter. These particles swell in 65/35 wt % heptane/isopropanol to give an increase in volume of about 3.34 times the original volume of the particle.

EXAMPLE 7

The procedure of Example 6 was followed except that 1.5 grams of BDA (0.3 equivalent wt. %) and 292.5 grams of iso-nonyl acrylate was used in place of lauryl acrylate. Particles of about 95 microns in diameter were obtained. The relative swelling volume, as tested above, was 1.26.

EXAMPLE 8

The procedure of Example 6 was followed except that 1.5 grams of BDA (0.69 equivalent wt. %) and 292.5 grams of 2-methylbutyl acrylate was used in place of lauryl acrylate. The polymerization was quite exothermic with the temperature rising to about 100° C. before the polymerization was cooled externally with an ice/water bath. Tack-free, elastomeric particles with an average diameter of 39.9 microns were obtained. The relative swelling volume, as tested above, was 11.4.

The following Example 9 illustrates the preparation of tack-free microspheres that do not contain an ionic comonomer.

EXAMPLE 9

To a 2-liter resin flask was added 900 ml deionized water and 30 grams of a 15 wt. % solution of Accostrength™ 86 in water. The mixture was neutralized to pH 7.0 with concentrated ammonium hydroxide. IOA, 288 g., 10.0 grams of BDA (7.5 equivalent wt. %) and 1.2 grams of Lucidol™ 70 were added and the flask purged three times with argon. Standapol™ A, 12.0 grams, was then added, the polymerization mixture purged once with argon, and the stirrer speed set to 450 rpm. The stirred mixture was then heated to 60° C. for 20 hours to obtain a suspension of tack-free, elastomeric microspheres with an average diameter of 52.3 microns.

Examples 10–13 illustrate the preparation of hollow, tack-free, elastomeric microspheres.

EXAMPLE 10

Into a one-liter resin reactor equipped with mechanical stirrer, condenser, and inlet-outlet lines for vacuum and argon, 450 grams of deionized water, 135 grams of IOA, 9 grams of AA, 6 grams of BDA (6.5 equivalent wt. %), and 0.71 gram of Lucidol™ 70 were charged. Vacuum was applied to evacuate the reactor atmosphere, and the reactor was then purged with argon. The agitation was set to 200 rpm and when the initiator had dissolved, 6.0 grams of Standapol™ A were added and the agitation increased to 400 rpm. The temperature of the reactor was raised to 60° C. and maintained at such temperature for 22 hours. An argon purge was maintained during the polymerization. After the 22-hour period, the suspension was allowed to cool to room temperature. The reactor was emptied and the suspension filtered. Optical microscopy revealed hollow microspheres 10 to 60 microns in diameter suspended in water. The majority of the microspheres contained a central cavity diameter of about 25 to 30% the diameter of the microspheres.

EXAMPLE 11

In a one liter resin reactor equipped with mechanical stirrer, 450 grams of deionized water and 6.0 grams of Standapol™ A were charged. The agitation was set to 200 rpm and the reactor heated to 65° C. In a separate container 139.5 grams of IOA, 9 grams of AA, 1.5 grams of BDA (1.7 equivalent weight %), and 0.71 gram of Lucidol™ 70 were mixed. When the temperature of the reactor reached 65° C. and the initiator had dissolved in the 93:6:1 weight % IOA:AA:BDA monomer mixture, the monomer mixture was added to the reactor while stirring at 400 rpm. The temperature of the reactor dropped to 60° C. and was maintained at 60° C. for 22 hours. After the 22-hour period, the suspension was allowed to cool to room temperature and the suspension filtered. Hollow microspheres of about 55 microns in diameter were obtained. The majority contained a central cavity diameter of about 50% the diameter of the microspheres.

EXAMPLE 12

The procedure of Example 11 was followed. The monomer composition used was 92:6:2 weight % IOA:AA:BDA (3.4 equivalent wt. % BDA). Optical microscopy revealed hollow microspheres 10 to 60 microns in diameter suspended in water.

EXAMPLE 13

The procedure of Example 12 was followed. The monomer composition used was 93.5:6:0.5 weight % IOA:AA:BDA (0.85 equivalent wt. %). Optical microscopy revealed hollow microspheres 10 to 60 microns in diameter suspended in water.

Various modifications and alterations of this invention will become apparent to those skilled in the art without departing from the scope and spirit of this invention, and should be understood that this invention is not to be unduly limited to the illustrated embodiments set forth herein.

We claim:

1. A tack-free, elastomeric, acrylate microsphere having a shear storage modulus of at least $1.0 \times 10^6$ Pascals at 23° C. and 1 Hz and a Tg of less than about 0° C., wherein said microsphere comprises the polymerization product of:

(a) about 40 to about 99.7 equivalent weight % of a free radically polymerizable monomer selected from the group consisting of alkyl acrylate esters of non-tertiary alkyl alcohols, wherein the alkyl groups of the alcohols comprise from about 4 to about 14 carbon atoms; alkyl methacrylate esters of non-tertiary alkyl alcohols, wherein the alkyl groups of the alcohols comprise from about 4 to about 14 carbon atoms; and mixtures thereof;

(b) optionally, up to about 45 equivalent weight % polar monomer copolymerizable with the monomer of element (a); and (c) a sufficient amount of a multifunctional crosslinking agent to yield said tack-free microsphere.

2. The microsphere of claim 1 wherein said monomer of element (a) is selected from the group consisting of isooctyl acrylate, 4-methyl-2-pentyl acrylate, 2-methylbutyl acrylate, isoamyl acrylate, sec-butyl acrylate, n-butyl acrylate, 2-ethylhexyl acrylate, isodecyl methacrylate, isononyl acrylate, isodecyl acrylate, and mixtures thereof.

3. The microsphere of claim 1 wherein said polar monomer is selected from the group consisting of ethylenically unsaturated monocarboxylic and dicarboxylic acids, hydroxyalkyl acrylates, cyanoalkyl acrylates, acrylamides, substituted acrylamides, N-vinyl pyrrolidone, acrylonitrile, and mixtures thereof.

4. The microsphere of claim 1 wherein said multifunctional crosslinking agent is selected from the group consisting of polyvinylic crosslinking agents.

5. The microsphere of claim 1 wherein said microsphere is hollow.

6. The microsphere of claim 1 wherein said microsphere is not hollow.

7. A tack-free, elastomeric, acrylate microsphere having a shear storage modulus of at least $1.0 \times 10^6$ Pascals at 23° C. and 1 Hz and a Tg of less than about 0° C., wherein said microsphere comprises the polymerization product of:

(a) about 80 to about 99.7 equivalent weight % of a free radically polymerizable monomer selected from the group consisting of alkyl acrylate esters of non-tertiary alkyl alcohols, wherein the alkyl groups of the alcohols comprise from about 4 to about 14 carbon atoms; alkyl methacrylate esters of non-tertiary alkyl alcohols, wherein the alkyl groups of the alcohols comprise from about 4 to about 14 carbon atoms; and mixtures thereof;

(b) optionally, about 0 to about 20 equivalent weight % polar monomer copolymerizable with the monomer of element (a); and (c) a sufficient amount of a multifunctional crosslinking agent to yield said tack-free microsphere.

8. The microsphere of claim 7 wherein said monomer of element (a) is selected from the group consisting of isooctyl acrylate, 4-methyl-2-pentyl acrylate, 2-methylbutyl acrylate, isoamyl acrylate, sec-butyl acrylate, n-butyl acrylate, 2-ethylhexyl acrylate, isodecyl methacrylate, isononyl acrylate, isodecyl acrylate, and mixtures thereof.

9. The microsphere of claim 7 wherein said polar monomer is selected from the group consisting of ethylenically unsaturated monocarboxylic and dicarboxylic acids, hydroxyalkyl acrylates, cyanoalkyl acrylates, acrylamides, substituted acrylamides, N-vinyl pyrrolidone, acrylonitrile, and mixtures thereof.

10. The microsphere of claim 7 wherein said multifunctional crosslinking agent is selected from the group consisting of multifunctional (meth)acrylates.

11. The microsphere of claim 7 wherein said microsphere is hollow.

12. The microsphere of claim 7 wherein said microsphere is not hollow.

13. The microsphere of claim 1 wherein said multifunctional crosslinking agent is selected from the group consisting of multifunctional (meth)acrylates.

14. The microsphere of claim 7 wherein said multifunctional crosslinking agent is selected from the group consisting of multifunctional (meth)acrylates.

15. The microsphere of claim 7 wherein said multifunctional crosslinking agent is selected from the group consisting of polyvinylic crosslinking agents.

* * * * *